United States Patent [19]
Beuer et al.

[11] Patent Number: 6,046,298
[45] Date of Patent: Apr. 4, 2000

[54] POLYURETHANE RESINS

[75] Inventors: Bernd Beuer, Monheim; Roland Gruetzmacher, Wuelfrath; Andreas Heidbreder; Johann Klein, both of Duesseldorf, all of Germany

[73] Assignee: Henkel Kommanditgesellschaft auf Aktien, Dusseldorf, Germany

[21] Appl. No.: 09/125,995

[22] PCT Filed: Feb. 19, 1997

[86] PCT No.: PCT/EP97/00774

§ 371 Date: Sep. 15, 1998

§ 102(e) Date: Sep. 15, 1998

[87] PCT Pub. No.: WO97/31959

PCT Pub. Date: Sep. 4, 1997

[30] Foreign Application Priority Data

Feb. 28, 1996 [DE] Germany .......................... 196 07 470

[51] Int. Cl.[7] .......................... C08G 18/42; C08G 18/64; C08G 18/40
[52] U.S. Cl. .......................... 528/74.5; 521/172; 521/170; 521/125; 528/80; 528/81; 528/57
[58] Field of Search ................................. 521/172, 170, 521/125; 528/74.5, 80, 81, 81.57

[56] References Cited

U.S. PATENT DOCUMENTS

| | | | |
|---|---|---|---|
| 4,267,081 | 5/1981 | Seneker | 528/74.5 |
| 5,045,590 | 9/1991 | Motomura et al. | 524/705 |

FOREIGN PATENT DOCUMENTS 06 395 216 4/1988 Japan .
01 287 182 11/1989 Japan .

OTHER PUBLICATIONS

Saunders, Frisch: Polyurethanes: Chemistry and Technology, II Technology, Interscience pp. 32–37, 198–199, 778–779 (1964).

*Primary Examiner*—Rabon Sergent
*Attorney, Agent, or Firm*—John E. Drach; Real J. Grandmaison; Thomas F. Roland

[57] ABSTRACT

A process for producing a polyurethane resin having an extended gel time by reacting a polyol component with a polyisocyanate in an NCO:OH ratio of from 10:1 to 1:10 wherein the polyol component contains from 0.1% to 100% by weight of a randomized castor oil prepared by heating castor oil for between about 0.1 and 15 hours at a temperature of between about 100° C. and 280° C. in the presence of a basic lithium salt.

12 Claims, No Drawings a temperature of at least 100° C. in the presence of the
POLYURETHANE RESINS

BACKGROUND OF THE INVENTION

1. Field of the Invention

This invention relates to the production of polyurethane materials from polyols based on randomized castor oil and isocyanates. The mechanical properties of the polyurethane materials according to the invention are comparable with those of the materials obtainable from unmodified castor oil, although the gel time of the systems is far longer.

2. Discussion of Related Art

The use of castor oil and/or other hydroxyfunctional triglycerides for the production of polyurethanes has been known for some time. For example, the production of elastomers from castor oil and corresponding isocyanates is described in Saunders, Frisch: "Polyurethanes: Chemistry and Technology, II Technology", Interscience (1964). However, optimal processing of these generally two-component systems involves a long gel time, i.e. the time during which the mixture of the two components can undergo irreversible changes in its external form should be considerable. A long gel time is of advantage above all where two-component (2C) systems are used for the production of coatings because, on the one hand, better flow is guaranteed and, on the other hand, the degassing time available to the system is clearly increased which can contribute towards reducing bubble formation. Overly short gel times can lead to poor processability of the polyurethane systems, for example even in summer or in countries with a generally fairly high ambient temperature.

Whereas the use of catalysts, such as dibutyl tin dilaurate for example, has generally been regarded among experts as the easiest solution to the problem of shortening the gel time, increasing the gel time is far more difficult. An extended gel time was achieved, for example, by incorporation of low molecular weight polyols although this resulted in a possibly unwanted deviation from the originally planned material properties. Accordingly, attempts to extend the short gel time or pot life of the mixtures without affecting material quality have hitherto failed.

Accordingly, the problem addressed by the present invention was to modify oleochemical polyols based on castor oil in such a way that, on the one hand, the polyol component could be processed to materials, such as casting resins or two-component foams for example, having the required mechanical properties while, on the other hand, the gel time of the polyols could be extended as required for their use in two-component systems.

It has now surprisingly been found that randomized castor oil, which is obtainable by heating castor oil at temperatures above 100° C. in the presence of lithium as catalyst, leads to a significant increase in the gel time without adversely affecting the properties of the polyurethane resin.

DESCRIPTION OF THE INVENTION

Accordingly, the present invention relates to a process for extending the gel time of polyurethane resins of isocyanates and a polyol component with an NCO:OH ratio of 10:1 to 1:10, characterized in that castor oil heated for about 0.1 to 15 hours to 100–300° C. in the presence of a basic lithium salt is used in a quantity of 0.1 to 100% by weight as a constituent of the polyol component.

The modification of the castor oil takes place under conditions which are normally used for the transesterification of triglycerides. Thus, the reaction is generally carried out in an inert gas atmosphere, the castor oil being heated to a temperature of at least 100° C. in the presence of the water-free lithium salts. The reaction temperature should generally not exceed 300° C. because otherwise product quality might suffer. Normally, the reaction is carried out at temperatures below that limit, above all for the production of light-colored modified castor oils with low viscosities. Accordingly, it has proved to be of advantage to carry out the reaction at a temperature in the range from about 150 to 280° C. and, more particularly, at a temperature of 200 to 280° C., temperatures in the range from 220 to 260° C. leading to particularly good results.

The reaction time should not be less than 0.1 hour while reaction times longer that about 15 hours generally produce no significant improvement in the results. The relationship between reaction time and temperature is well known to the expert, so that higher temperatures can be compensated within wide limits by shorter reaction times and lower temperatures by longer reaction times. Reaction times of 0.5 to 10 hours generally lead to good results so far as the viscosity of the resulting polyols is concerned. Reaction times of 1 to 8 or 2 to 6 hours at temperatures of 220 to 260° C. normally lead to the desired product.

Basically, any catalysts which are known to be suitable for the catalysis of esterification reactions may be used for the modification (randomization) reaction. In general, however, the expert will resort to basic esterification catalysts, more particularly to the salts of the alkali and/or alkaline earth metals showing a basic reaction in aqueous solution, such as for example lithium, sodium, potassium, calcium and/or magnesium. Depending on their effectiveness, these catalysts may be used in concentrations ranging from a few ppm (parts per million) to a few percent, for example in concentrations of 0.1 ppm to about 2%. However, residual contents of catalyst can be problematical to the subsequent use of the polyols. If the residual contents of alkali metals are too high, the polyurethanes obtained are generally of inferior quality with properties that do not meet normal requirements, particularly in regard to hydrolysis stability. In general, therefore, the catalysts have to be removed from the polyol by one or more different purification steps. The residual alkali metal contents can thus be reduced to sufficiently low levels for the required subsequent processing to the polyurethane. Modified castor oils produced in this way should have a residual alkali metal or alkaline earth metal content of no more than about 10 ppm, lower residual contents, such as 5, 2 or 1 ppm down to the detection limit of the particular determination method applied being advantageous.

An exception is the lithium ion. On the one hand, even small quantities enable the transesterification to be carried out; on the other hand, it has little or no influence on the properties of the resulting polyurethanes, so that there is generally no need for the polyol component to be purified where lithium catalysts are used. Accordingly, the use of basic lithium compounds, such as lithium hydroxide, lithium carbonate, lithium acetate, lithium alkoxylates or the lithium salts of higher fatty acids, has proved successful for the purposes of the invention. The transesterification catalyst is normally added to the reaction mixture in a concentration of 0.1 to 500 ppm and preferably in a concentration of 0.1 to 300 ppm. Accordingly, polyol mixtures with a lithium content of at most about 200 ppm are advantageous for the purposes of the invention. Lithium contents with an upper limit of at most 100, preferably below 70 and more preferably below 50 ppm have a particularly positive effect on the color and hydrolysis stability of the resulting polyurethanes by comparison with higher or identical contents of other alkali metals. The most suitable polyols for the purposes of the invention have negligible contents, if any (advantageously less than 10 ppm), of alkali metals apart from lithium, the lithium content advantageously being below 40 ppm.

The polyols obtainable in this way generally have substantially the same characteristic data as the castor oil originally used. Thus, their OH value normally falls by no more than 2 to 7 mg KOH/g while the Höppler viscosity (25° C.) of the modified oil compared with the castor oil used, which has a Höppler viscosity of 970 mPas (25° C.), is generally increased by only about 50 to 150 mPas and preferably by only 50 to 120 mPas.

The castor oil used for the randomization may be both pure castor oil and the technical triglyceride which may contain other fatty acid esters besides the esters of ricinoleic acid. Thus, besides ricinoleic acid, palmitic acid, stearic acid, oleic acid and/or linoleic acid, for example, may occur in small quantities of up to about 5% and, in individual cases, even higher. In general, however, the castor oil used should contain at least 80% of ricinoleic acid units.

The randomized castor oil will generally be the only constituent of the polyol mixture, although it may be necessary or at least advantageous for modifying the properties of the resulting polyurethane to add other components to the polyol mixture. Such polyol mixtures contain 2, 3 or more polyol components. Accordingly, the percentage content of the modified castor oil in the polyol mixture as a whole may fall to 90, 80 or 70% by weight. The modified castor oil may even make up only about half the polyol mixture as a whole, a margin of 1% by weight existing in this case. However, even smaller quantities of castor oil can still make a contribution towards increasing the gel time of the polyurethane resins. Quantities of only about 1 to 49% by weight may be sufficient for this purpose.

However, both low molecular weight polyols and relatively high molecular weight, hydroxyfunctional molecules up to correspondingly functionalized polymers are suitable as further constituents of the polyol mixture. For example, other hydroxyfunctional triglycerides may be present in the polyol mixture. The hydroxyfunctional triglycerides may be of both natural and synthetic origin. For example, unsaturated triglycerides can be epoxidized by per acids and the oxiranes obtainable in this way may be reacted in acid- or alkali-catalyzed ring opening reactions with monohydric or polyhydric alcohols to form hydroxyfunctional triglycerides. Suitable unsaturated triglycerides are those of synthetic and/or natural origin with iodine values of 30 to 150 and preferably in the range from 85 to 125. Typical examples of the group of unsaturated triglycerides are linseed oil, palm oil, palm kernel oil, coconut oil, peanut oil, tea oil, olive oil, olive kernel oil, babassu oil, meadowfoam oil, chaulmoogra oil, coriander oil, soybean oil, lard oil, been tallow, lard, fish oil and sunflower oil and rapeseed oil from old and new plants.

Oxiranes of the type in question are normally ring-opened with monohydric or polyhydric alcohols. According to the invention, monohydric alcohols are preferably used. Monohydric alcohols include both aliphatic and aromatic alcohols, aliphatic alcohols preferably being used. The alcohols used may be branched or unbranched, saturated or unsaturated, although aliphatic saturated alcohols are preferably used. Methanol, ethanol, n-propanol, isopropanol, n-butanol, isobutanol, tert.butanol, pentanol, hexanol, heptanol and the higher homologs are preferably used for the ring opening reaction.

Fatty alcohols containing 8 to 22 carbon atoms may also be used for the ring opening reaction. Fatty alcohols in the present context are primary aliphatic alcohols corresponding to formula (I):

$$R^1OH \quad (I)$$

in which $R^1$ is an aliphatic, linear or branched hydrocarbon radical containing 6 to 22 carbon atoms and 0 and/or 1, 2 or 3 double bonds.

Typical examples are caproic alcohol, caprylic alcohol, 2-ethylhexyl alcohol, capric alcohol, lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, linolyl alcohol, linolenyl alcohol, elaeostearyl alcohol, arachyl alcohol, gadoleyl alcohol, behenyl alcohol, erucyl alcohol and brassidyl alcohol and the technical mixtures thereof obtained, for example, in the high-pressure hydrogenation of technical methyl esters based on fats and oils or aldehydes from Roelen's oxosynthesis and as monomer fraction in the dimerization of unsaturated fatty alcohols.

The hydroxyfunctional triglycerides may optionally be subjected to transesterification with polyhydric alcohols. The alcohols used for this purpose generally have functionalities of 2 to 10 and preferably 2 to 6. They include, in particular, diols such as, for example, ethane-1,2-diol, propane-1,2-diol, propane-1,3-diol, butane-1,4-diol, hexane-1,6-diol or neopentyl glycol; and polyols such as, for example, trimethylol propane, glycerol, trimethylol ethane, pentaerythritol, sorbitol and/or oligomeric glycerols. Besides the unmodified alcohols, however, derivatives thereof, for example reaction products with ethylene oxide and/or propylene oxide, may also be used for the transesterification reaction. For example, alkoxylated alcohols containing 2 or 3 OH groups, such as ethane diol, propane diol, glycerol, pentaerythritol, trimethylol propane and/or trimethylol ethane, may be used. Parameters such as, for example, hydrolysis stability, hydrophilicity or even the gel time can be further influenced by the incorporation of such alcohols.

Besides their use as alcohols in the transesterification reaction, the low molecular weight polyhydric alcohols mentioned above may be added both in unmodified form and in alkoxylated form to the polyol mixture containing the modified castor oil.

Suitably functionalized macromolecules, for example hydroxy-terminated polyesters or polyurethanes and suitably functionalized polyacrylates, may optionally be used as a further constituent of the polyol mixture.

Besides the polyol mixtures, the polyisocyanates are the second important building block for the polyurethane materials according to the invention.

Isocyanates react with free hydroxy groups to form a urethane group in an addition reaction well-known to the expert. In general, suitable isocyanate components according to the invention are any of the usual polyfunctional aromatic and aliphatic isocyanates and, for example, any of the oligomeric and polymeric isocyanate compounds obtainable by the oligomerization or cyclization of polyisocyanates in the presence of moisture or by reaction of polyhydric alcohols with polyisocyanates. The polyisocyanates may be used in more or less than the stoichiometrically necessary quantities. Examples include hexamethylene diisocyanate, HDI trimer (tris(6-isocyanatohexyl)isocyanurate (Tolonate® HDT, Rhone-Poulenc), 4,4-diphenylmethane diisocyanate (MDI) (Desmodur® Bayer AG), HDI biuret (1,3,5-tris(6isoisocyanatohexyl)biuret, hexamethylenediisocyanate (Desmodur® N75, Bayer AG) and an aromatic polyisocyanate based on toluene diisocyanate (Desmodur® L67, Bayer AG). The isocyanates may be used both in pure form and in the form of technical mixtures with or without solvent.

The reaction between polyols and isocyanates normally takes place at a temperature in the range from 0 to 100° C. and preferably at a temperature in the range from 5 to 50° C. For processing, the components are normally first intensively mixed and then processed during the remaining pot life. The components may be mixed either by the user himself by stirring, whisking or other measures suitable for mixing, although mixing may also be carried out by an automatic mechanism, as for example during removal from a pressurized container with separate compartments for polyol and isocyanate. The mixture thus formed may be further processed to coatings, casting resins, foams or composite materials. Accordingly, the ratio of NCO to OH groups can vary according to the intended application. In general, an NCO:OH ratio of 8:1 to 1:8 or 4:1 to 1:4 is sufficient for all applications. However, it is well known to the expert that a narrower NCO:OH ratio, for example from 1.5:1 to 1:1.5, generally leads to products of relatively high molecular weight. Where particularly durable and rigid materials are required, an NCO:OH ratio of about 1:1 is recommended.

Accordingly, the present invention also relates to a process for extending the gel time of polyurethane resins of isocyanates and a polyol component with an NCO:OH ratio of 10:1 to 1:10, characterized in that castor oil heated for about 0.5 to 15 hours to 100–300° C. in the presence of a basic lithium salt is used in a quantity of 0.1 to 100% by weight as a constituent of the polyol component.

The production of polyurethane foams generally requires at least one blowing agent and, optionally, one stabilizer. In addition, other additives, for example solvents, flameproofing agents, plasticizers, cell regulators, emulsifiers, fungicides, fillers, pigments and antiagers, may be incorporated.

Preferred blowing agents are 1,1,1,2-tetrafluoroethane, 1,1-difluoro ethane and dimethyl ether. However, carbon dioxide, dinitrogen oxide, n-propane, n-butane and isobutane may also be used. Chlorine-free fluorocarbons with boiling points of −40 to +60° C., propane/butane mixtures and dimethyl ethers or mixtures thereof are preferably used as blowing agents and solvents.

The foam-forming composition may additionally contain stabilizers. "Stabilizers" in the context of the invention are, on the one hand, stabilizers which stabilize the viscosity of the composition during production, storage and application. Monofunctional carboxylic acid chlorides, monofunctional highly reactive isocyanates and non-corrosive inorganic acids, for example, are suitable for this purpose. Benzoyl chloride, toluene sulfonyl isocyanate, phosphoric acid or phosphorous acid are mentioned by way of example.

Stabilizers in the context of the invention are also antioxidants, UV stabilizers or hydrolysis stabilizers. The choice of these stabilizers is determined on the one hand by the principal components of the composition and, on the other hand, by the application conditions and by the loads the foam plastic is expected to withstand. Normally, antioxidants, optionally in combination with UV stabilizers, are mainly required. Examples of suitable UV stabilizers are the commercially available sterically hindered phenols and/ or thioethers and/or substituted benzotriazoles or sterically hindered amines of the HALS (hindered amine light stabilizer) type. Hydrolysis stabilizers, for example of the carbodiimide type, may optionally be used to stabilize the ester bonds.

The present invention also relates to the use of the polyurethanes according to the invention in composite materials and/or blends, blends in the context of the invention being homogeneous micro- or macro-separated mixtures with other polymers. To this end, the polyurethanes may be processed in various mixing ratios with one or more additional components to form a material having improved and/or new properties. In contrast to fillers, which mainly have a cost-reducing function, the additives discussed in the following perform a functional task in the material mainly associated with an improvement in its physical properties.

To produce composite materials, the polyurethanes according to the invention are processed, for example, with natural or synthetic fibers, chopped strands, cloths or the like. Suitable materials are, for example, natural fibers, such as silk, cotton, wool, jute, hemp, flax, sisal, straw or the like. However, secondary products of these fibers in their processed form, for example as woven cloths, are also suitable. The fibers may be incorporated in the polyurethanes according to the invention both in untreated form and in treated form. Suitable surface treatment formulations are, for example, the siloxane-based or polyester-based sizes known to the expert for such surface treatments. Many of the composite materials thus formed have excellent stability, tear strength, abrasion resistance and toughness, as required for many applications. Besides natural fibers, synthetic fibers, for example polyamide, polyester, polyether or carbon fibers or even inorganic fibers, for example glass fibers and glass fiber mats, may also be incorporated.

Accordingly the polyurethanes according to the invention are suitable in principle for the production of foams, casting resins, coatings and/or composite materials.

The following Examples are intended to illustrate the invention without limiting it in any way.

EXAMPLES

All quantities are expressed in parts by weight, unless otherwise specifically indicated.

|  | Example 1 | Example 2 | Comparison Example 1 | Comparison Example 2 |
|---|---|---|---|---|
| Modified castor oil | 100 | 100 |  |  |
| Castor oil |  |  | 100 | 100 |
| Zeolite paste | 5 | 5 | 5 | 5 |
| Polymer MDI (31% NCO) | 41 | 41 | 41 | 41 |
| Gel time (25° C.) | 53 mins. | 61 mins. | 29 mins. | 37 mins. |

What is claimed is:

1. The process of producing a polyurethane resin having an extended gel time comprising reacting a polyol component with a polyisocyanate in an NCO:OH ratio of from 10:1 to 1:10 wherein said polyol component contains from 0.1% to 100% by weight of a randomized castor oil prepared by heating castor oil for between about 0.1 and 15 hours at a temperature of between 100° C. and 280° C. in the presence of a basic lithium salt.

2. A process as in claim 1 wherein said polyol component contains less than 100 ppm of lithium ions.

3. A process as in claim 1 wherein said castor oil is heated to a temperature of between 200° C. and 280° C.

4. A process as in claim 1 wherein said NCO:OH ratio is from 4:1 to 1:4.

5. A process as in claim 1 wherein said polyurethane resin has a gel time of more than 40 minutes.

6. A process as in claim 1 further including preparing a foam, casting resin, coating or composite material with said polyurethane resin.

7. A polyurethane resin having an extended gel time, said polyurethane resin comprising the reaction product of a polyol component and a polyisocyanate in an NCO:OH ratio of from 10:1 to 1:10 wherein said polyol component contains from 0.1% to 100% by weight of a randomized castor oil prepared by heating castor oil for between about 0.1 and 15 hours at a temperature of between 100° C. and 280° C. in the presence of a basic lithium salt.

8. A polyurethane resin as in claim 7 wherein said polyol component contains less than 100 ppm of lithium ions.

9. A polyurethane resin as in claim 7 wherein said castor oil is heated to a temperature of between 200° C. and 280° C.

10. A polyurethane resin as in claim 7 wherein said NCO:OH ratios is from 4:1 to 1:4.

11. A polyurethane resin as in claim 7 wherein said polyurethane resin has a gel time of more than 40 minutes.

12. A polyurethane resin as in claim 7 in the form of a foam, casting resin, coating or composite material.

* * * * *